United States Patent Office 3,517,491
Patented June 30, 1970

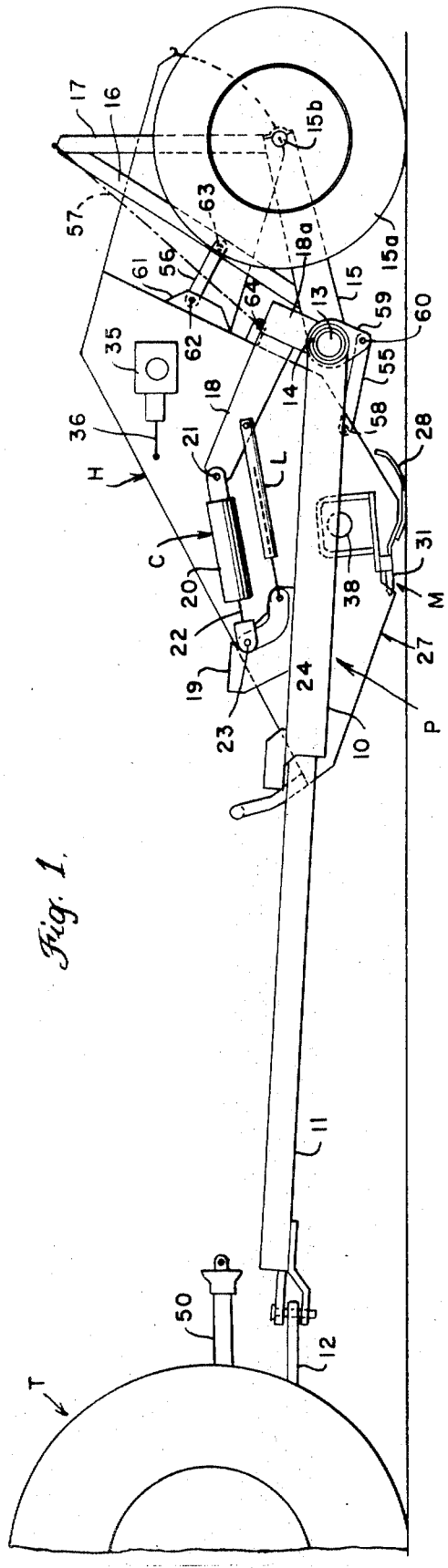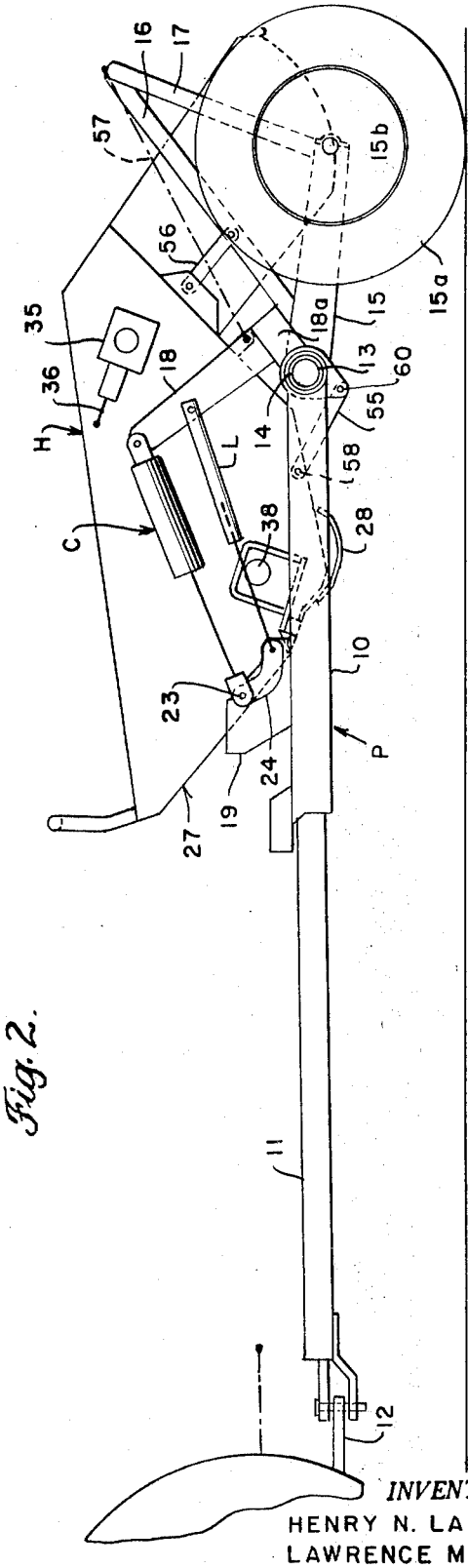

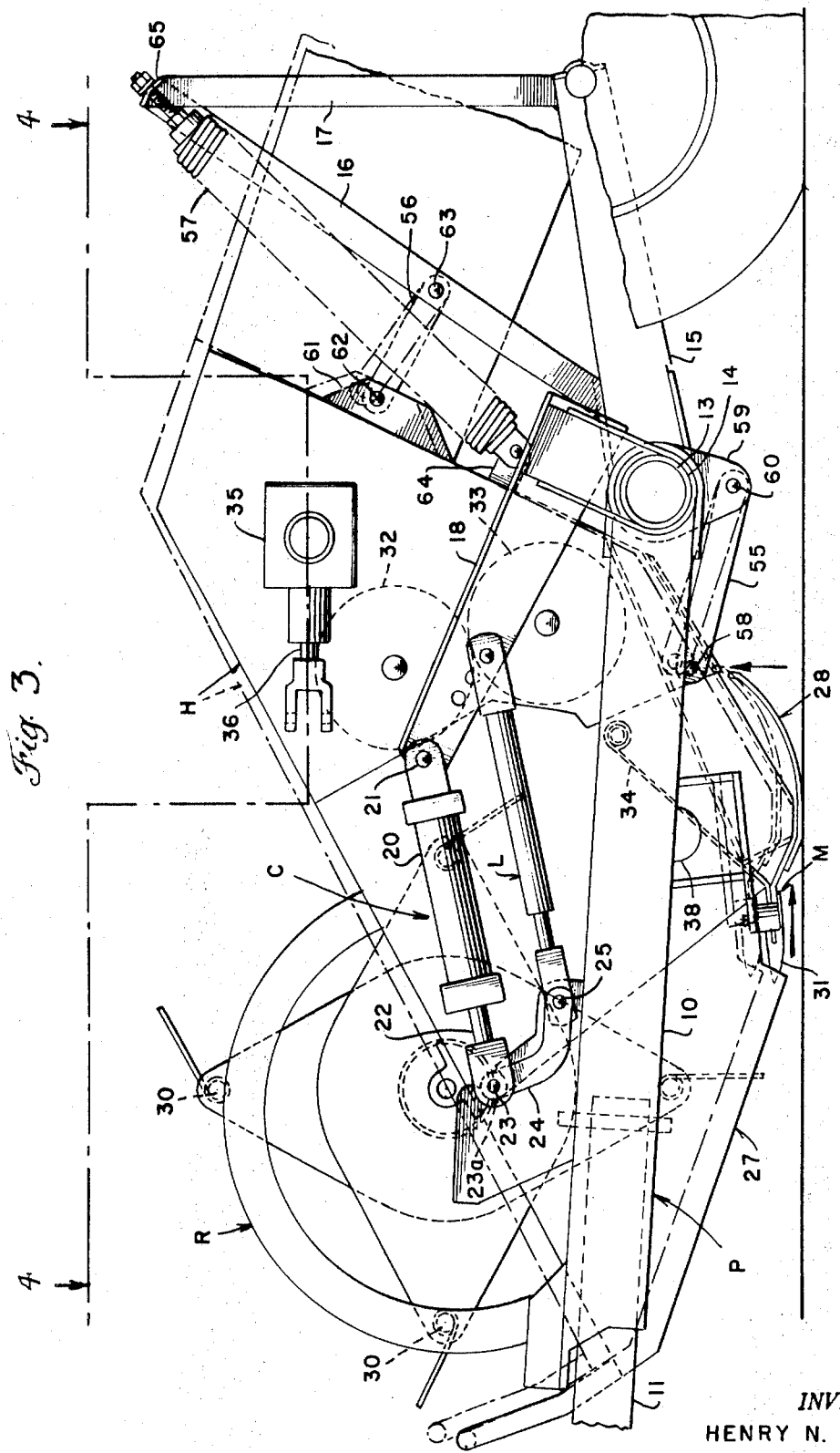

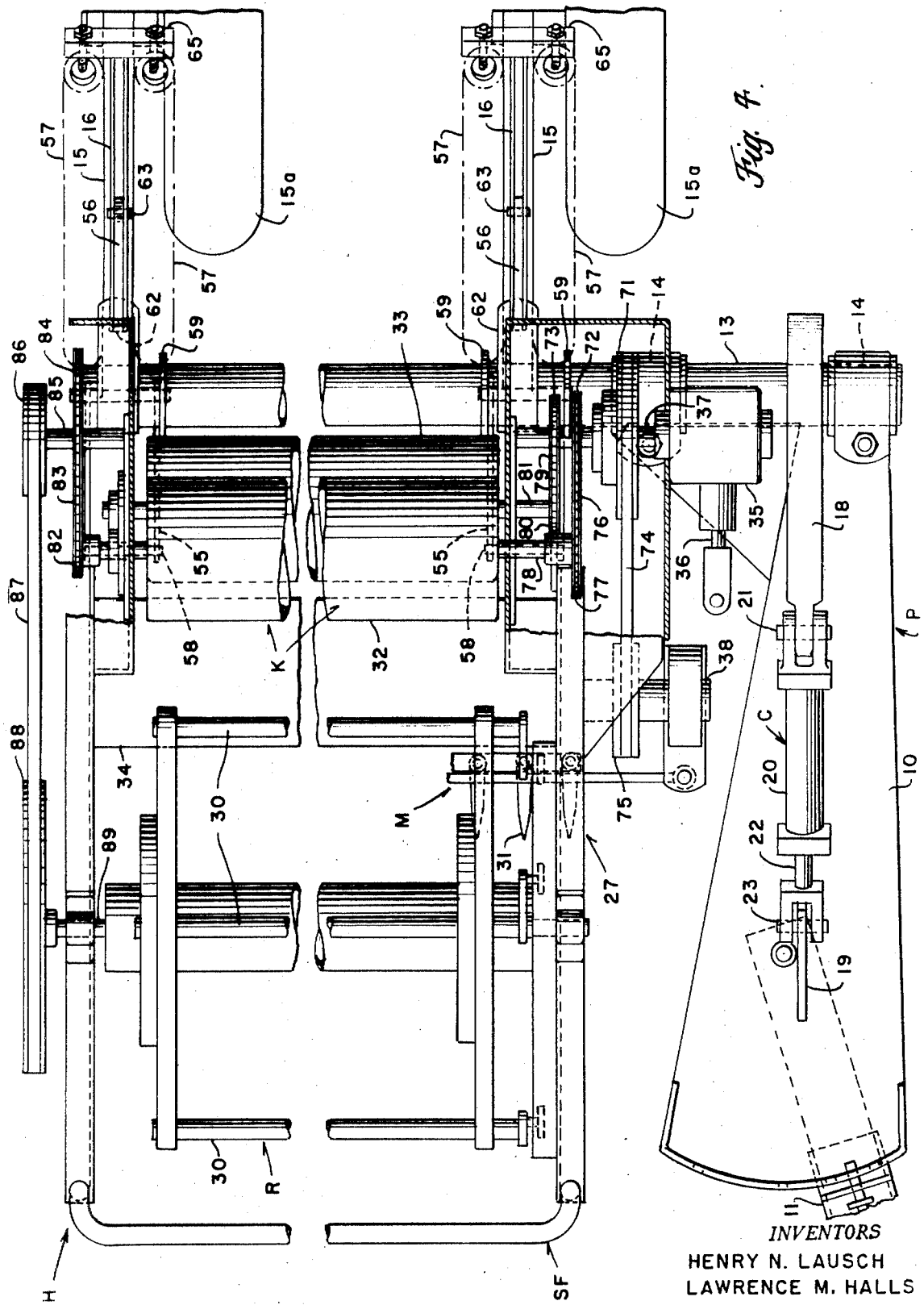

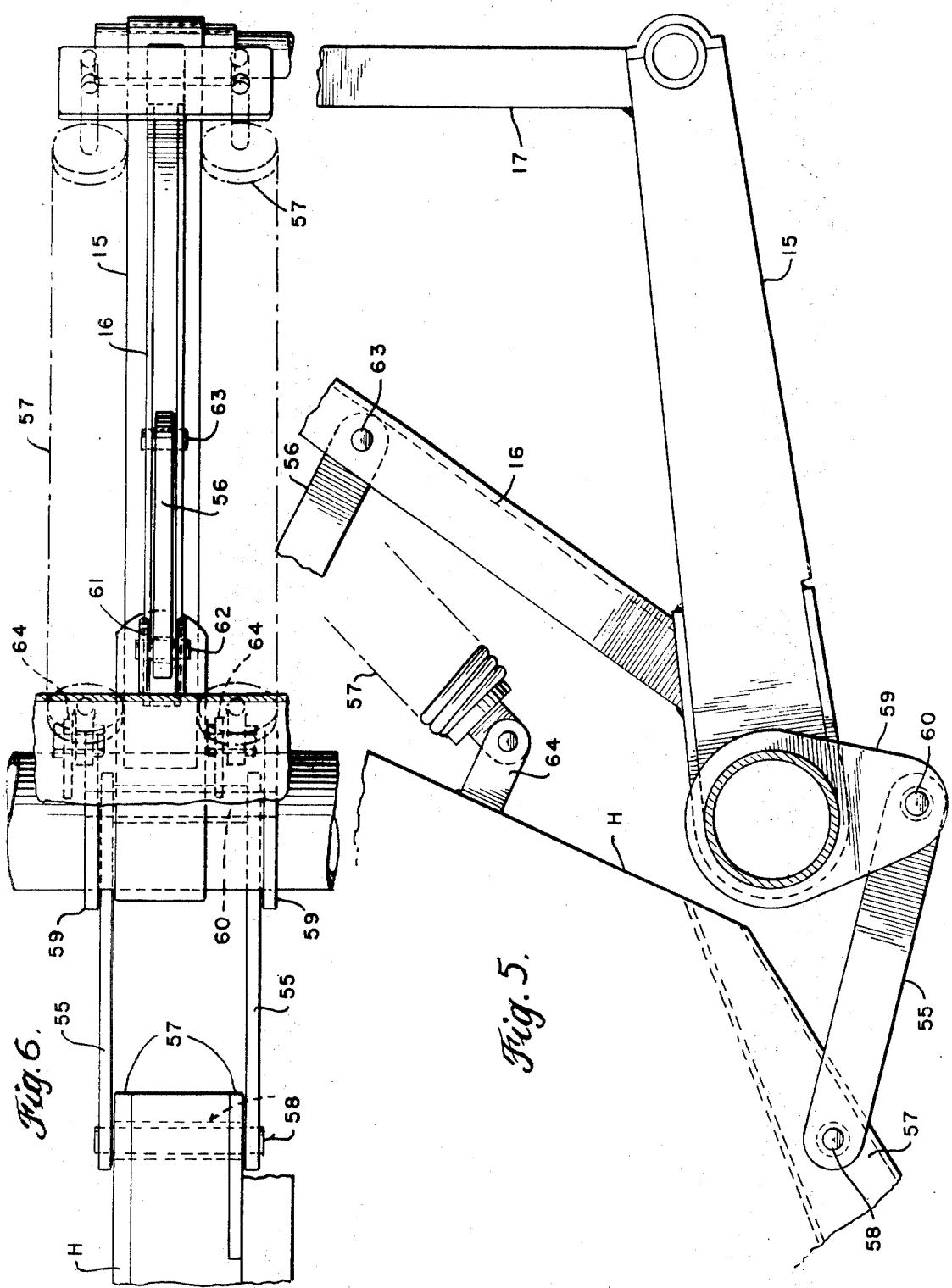

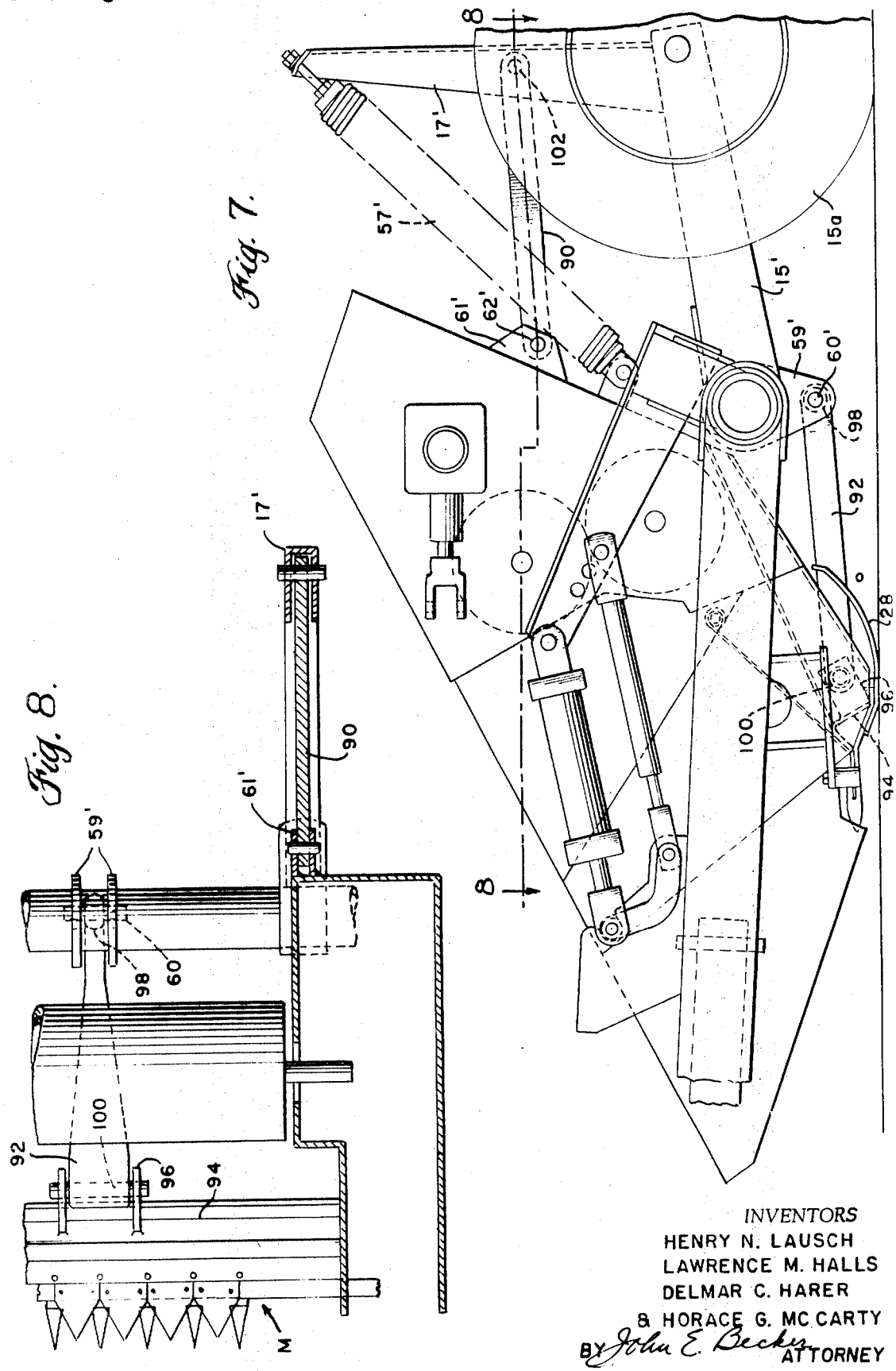

3,517,491
HEADER SUSPENSION MOUNTING FOR PULL-TYPE HARVESTERS
Henry N. Lausch, Leacock, Lawrence M. Halls and Delmar C. Harer, New Holland, and Horace G. McCarty, Leola, Pa., assignors to Sperry Rand Corporation, New Holland, Pa., a corporation of Delaware
Filed Aug. 8, 1968, Ser. No. 751,153
Int. Cl. A01d *43/10*
U.S. Cl. 56—23                                    13 Claims

ABSTRACT OF THE DISCLOSURE

An improved header suspension mounting for pull-type harvesting machines imparting improved header flotation characteristics by a unique combination of counterbalancing springs and pivotal connecting link means, the latter of which in one embodiment are so related that when the cutterbar of the header unit hits a relatively immovable object (stone, stump, etc.) the inertia of the total header and flotation weight is readily overcome vertically and rearwardly to relieve the guards of the impact against said object. In another embodiment, the mounting includes differently disposed pairs of substantially longer, parallel disposed upper and lower links of substantially equal length connecting the upper and lower portions of the header assembly to portions of the main frame to provide substantially improved lateral flotation characteristics of the header.

BACKGROUND OF THE INVENTION

The present invention relates generally to agricultural harvesting machines and like apparatus having adjustable crop gathering headers. More particularly, the invention relates to an improved header suspension and balance or roll tensioning means in a wheel supported mower-conditioner machine.

In several of the current header units, the crop harvesting elements comprise cutterbar mowing means, crop conditioning roll means and crop reel combing or raking means for raking the crop across the cutterbar means and directing it into the conditioning roll means, whereupon it is discharged rearwardly into a swath or into windrow forming means. With respect to the pivotally mounted header, the crop harvesting elements are normally mounted on a subframe which is journalled on a portion of an articulated, generally L-shaped main frame structure, said subframe being generally pivotally movable about a transverse rockshaft of said main frame structure by means of a hydraulic actuator of other suitable means. The subframe is resiliently supported on the main frame for combined vertical and lateral flotation so that it can follow the contour of the ground. It is this later facet to which the present invention is directed for improving the suspension and flotation characteristics of the machine as well as to provide generally improved mounting means whereby the inertia of the resiliently suspended header may be overcome vertically and rearwardly upon sharp impact with an object such as a stone or stump or the like, to relieve the cutter guards of the impact against an object. The header mounted crop harvesting elements receive their respective drives through a drive system well known in the art and forming no novel part of the present invention.

In mower-conditioners of this type, an articulated type of frame is preferably used in a pull-type harvester, including the aforementioned transversely extending rockshaft which is supported on a pair of axially spaced and radially extending wheel arms, each of which carries a ground engaging wheel. The header unit is pivotally mounted for movement about the rockshaft by means of combined resilient suspension spring assemblies and pairs of upper and lower link means, said header being vertically adjusted by pivoting of the rockshaft to which the header is indirectly connected by the suitable link spring means, and during which said rockshaft moves in a vertical direction responsive to the rotation thereof, in cooperation with and about the axis of a pair of articulated ground-engaging wheels.

SUMMARY OF THE INVENTION

The present invention is directed preferably to harvesting header suspension means for mower-conditioner type headers whereby improved suspension and flotation characteristics are achieved to enable the header when in the lowered position to more closely float and follow the changing contours of the ground, and to ride very smoothly when in the raised transport position.

Headers of this type are of substantial size and carry many structural components including the various crop treating elements such as the cutter, the reel means, and the crop conditioning roll means, and their related drives. It is apparent that a strong framework is required to carry such structure and the entire header must be reliably mounted on the main frame of the machine and movable close to the ground during cutting of most crops, elevated from the ground when in transport and located at intermediate locations when working in certain crop materials.

Accordingly, one object of the invention is to provide a header suspension and lift means which supports the header primarily by spring means when the header is in the lowered normal operating position and independently of the mechanical lift structure whereby the header is able to "float" and follow the contours of the ground to insure optimum operation.

Another object of the invention is to provide an improved header suspension system which is so constructed that one side of the header, or the other or both sides may drop downwardly or raise vertically to follow the ground irregularities during operation of the machine.

Still another object of the invention is to provide an improved lift system for a mower-conditioner header which is mounted for pivotal movement generally about a horizontal axis and is supported for unlimited floating action whereby one side of the header, or the other side, or both sides may drop downwardly or raise vertically during operation to compensate for changes in ground irregularities.

Still another object of the invention is to provide resilient spring means and positive link means to comprise the suspension and part of the lifting system, with the resilient means primarily supporting the header in an operative position and a combination of the positive link means and spring means for moving the header to a transport position.

Other objects of the invention will become apparent hereinafter from reference to the specification and from the recital of the appended claims.

DESCRIPTION OF THE DRAWINGS

FIG. 1 is a semi-diagrammatic, general side elevational view of a pull type mower-conditioner machine with the header thereof disposed in its lowest operating position, and showing the machine connected to a towing tractor;

FIG. 2 is a view similar to that of FIG. 1 showing the header and its fully raised transport position;

FIG. 3 is an enlarged side elevational view of the main header portion of the machine of FIG. 1, better showing the suspension and link mounting means of the header unit, and also showing the header in a slightly raised recoiled position as indicated in dot-and-dash outline as it would assume responsive to the mower guard sharply striking a rather solid object such as a large stone or stump.

FIG. 4 is an enlarged top plan view of the machine in FIG. 3 but having a central broken away portion to enable the view to be depicted on the enlarged scale in a clear manner, said view being taken approximately on the irregular line 4—4 of FIG. 3;

FIG. 5 is an enlarged fragmentary side view of the header suspension system of the embodiment shown in FIGS. 1 and 3, with the rockshaft shown in cross-section;

FIG. 6 is an enlarged top plan view corresponding substantially to the components shown in FIG. 5;

FIG. 7 is an enlarged side elevational view of a modified header suspension system; and FIG. 8 is a fragmentary cross-sectional detailed view taken substantially on line 8—8 of FIG. 7.

DESCRIPTION OF PREFERRED EMBODIMENTS

Referring now to the drawings in more detail, the machine has a rugged, generally L-shaped, base frame of the pull-type and is generally designated P, and has mounted thereon a unitized subframe carried header designated generally H. The machine is intended to be pulled by a conventional farm tractor generally designated T (shown framentarily). The header H is pivotally and resiliently mounted on the main frame and is adjustable for different attitudes with respect to the frame and to the ground. The header comprises various crop treating elements which are driven by suitable drive system designated D. A main frame-mounted lift means including a piston and cylinder means C is utilized for vertically adjusting the header with respect to the ground and to the machine frame. The header H is resiliently mounted to the frame P by means of a suitable suspension system S, with the header being pivotally raisable about a predetermined transverse axis by the cooperation of the suspension system S and of the said lift system C.

The header H comprises a subframe SF which supports the crop treating elements including a mower preferably of the reciprocable sickle type designated M, a crop engaging reel R which serves to rake the crop material across the sickle mower and directs the cut material into crop conditioning roll means designated K, whereupon the conditioned crop material is discharged rearwardly into selective windrow or swath forming means W (FIGS. 1 and 2) mounted behind the machine.

More specifically the pull-type unit comprises an L-shaped main frame including a fore-and-aft directed first leg portion designated generally 10 and having a forwardly extending pivoted drawbar 11, the latter of which is pivotally attached also at its forward end to the conventional drawbar 12 affixed to a conventional tractor T. The main frame further includes a transversely extended tubular rockshaft or leg 13 which is rotatably or rockable about its axis and on which frame member 10 is pivotally mounted by a pair of sleeve bearings 14, 14; a pair of laterally spaced radially extending wheel arms 15, 15, upon each of which is journalled a wheel 15a, project rearwardly behind the transverse frame leg 13 and are similarly pivotally mounted thereon; said arms 15, 15 serving as bases of a pair of composite triangular shaped, rigidly connected, wheel and header support frames constituted by said arms 15 and upright frame members 16 and 17. The latter triangular, rigid support frames are independently mounted and are pivotal about transverse rockshaft 13 as desecribed relative to arm 15. The header H is attached at least in part to the hypotenuse frame member 16, as will be described in more detail. When the frame is adjusted responsive to rocking or rotating transverse leg 13 to achieve header adjustment, said frame also pivots upwardly in an articulated manner about the axis 15b of the ground supporting wheels 15a, as seen by a comparison of FIGS. 1 and 2.

The means for lifting the header from the operating posiition of FIG. 1 to this raised transport position in FIG. 2, and for effecting the attendant attitude change of the triangular change, includes the piston device C, a heavy duty bellcrank type life arm 18 having one end welded to the rockshaft 13 by means of a weld bracket 18a, and a fixed support bracket 19 secured on a forward portion of the main frame 10, disposed in aligned spaced relation to arm 18. The piston device C, interposed between these lift and support brackets, comprises a conventional hydraulic cylinder 20 and piston 22, with the cylinder 20 being pivotally connected to the lifting arm 18 by means of a pin 21, and with piston 22 connected by means of pin 23 to composite bellcrank link means 24, said pin 23 selectively resting in a recessed arcuate notch 23a in the upper part of bracket 19 (FIG. 3). Link means 24 preferably comprises a split arm straddling bracket 19 and pivotally mounted to bracket 19 by means of pin 25 better seen in FIG. 3. In spaced relation beneath the cylinder assembly C there is a telescopic link assembly L attached to the bracket 19 and to the lift arm 18, and which comprises part of a locking means to selectively lock the header in a raised condition for transport or service purposes, said locking means being the subject of a separate co-pending application Serial No. 612,462.

Proceeding to the header H, it comprises a generally a sub-frame 27 having a pick-up reel R including a plurality of transversely extended and circumferentially spaced tine carrying arms 30; a sickle type mower designated M having the reciprocable cutter means 31 and a wobble driving head 38 mounted on the sub-frame adjacent the ground and extending transverse to the direction of travel. The wobble drive to the sickle translates the rotary motion of the associated shaft mounted pulley 75 into reciprocable motion for the sickle M. A pair of adjustably mounted skid shoes 28 are attached beneath the sickle mower assembly M in laterally spaced relation. The shoe adjustment features, while not shown in this application, provide for a plurality of preferably three of four positions which selectively permit the cutter bar and header to be elevated in small progressive increments above the ground to accommodate crops of varying height and which will effectively vary the angle of the drive components. Reference may be made to assignee's copending application Ser. No. 612,462 filed Jan. 30, 1967, for details of the skid shoe and related means.

The header further includes upper and lower infeed crop-conditioning rolls 32 and 33 suitably supported and respectively having appropriate drive shafts and sprockets which will be further clarified, and an inclined floor plate 34 disposed transversely to the direction of travel of the machine and behind the sickle cutter for receiving and upwardly deflecting the cut crop material toward the conditioning rolls 32, 33. Also mounted on the header, on the same side as the fore-and-aft leg 10 of the main frame, is a right angle gearbox 35. Gearbox unit 35 includes the conventional bevel gears for transmitting power from the tractor PTO to the various drive components of the header by means of the power input shaft 36 and an output shaft 37 (FIG. 4).

Attachment and suspension of the unitized header H to the pull unit P, is accomplished in an improved manner by means of pairs of independent links disposed at each lateral side thereof. The lower links 55 are provided in sets of two, as better shown in enlarged detail in FIGS. 5 and 6, and are connected at their respective forward ends to suitable widely spaced brackets 57, 57 on the underside of the header by means of elongated sleeve bearing and pin assembly 58. They are similarly attached at their rearward ends to corresponding pairs of depending lugs or crank arms 59, 59 attached to the rockshaft 13, by means of an elongated sleeve bearing and pin assembly 60. Horizontal stability of the header is maintained by these points of attachment at generally laterally opposite sides of the header. The upper singular links 56 are connected at their forward ends to the uppermost of a pair of oversize mounting holes provided in attachment ears 61 on the header by means of a pin 62, and by pins 63 at their rearward end to a medial portion of hypotenuse frame member 16. The mounting ears are preferably attached to the header frame in predetermined relation so that the preformed pair of adjustment holes provide selective use depending upon whether the assembly is being made for a pull-type or a self-propelled type of machine. The oversize holes enable the link a greater range of torsional twist during flotation. The header unit is resiliently suspended upon the main frame by means of a plurality of counterbalancing flotation springs 57 disposed at opposite sides of the frame, preferably in pairs, and connected at their lower ends at a point substantially below the point of attachment of links 56 to lugs 64 of the header, and at their upper ends to lateral brackets 65 attached to the upper ends of each of said triangular frames. The springs 57 serve to counterbalance the weight of the header and include tension adjusting means 68.

It is apparent from the foregoing that this construction enables the header to floatingly follow the contour of the ground due to the independent mounting of each wheel and of each side of the header. Due to the low disposition of the pivot points of the wheels and transverse leg 13, this unique suspension enables the pull of the tractor vehicle to impart a lifting action to the header and together with its angular adjustable skids 28 precludes gouging of the cutter sickle into the ground.

With reference to the drive system for driving the header components, any suitable drive system D may be utilized and interposed between the tractor PTO 50 and the input shaft 36 of the right angle gearbox 35 mounted on the header aforesaid. Referring to FIG. 4, however, part of the drive system for driving the header components will be generally described. As better seen in FIG. 4, the input shaft 36 of the gearbox 35 drives the main output shaft 37 which is suitably journalled in the header framework. Shaft 37 is provided with a plurality of drive members in laterally spaced relation including a drive pulley 71 and drive sprockets 72 and 73. A drive belt 74 connects pulley 71 with an aligned driven pulley 75 mounted in association with and for imparting drive via wobble unit 38 to the cutter 31 of the sickle mower unit M. An adjustable idler pulley (not shown) may be provided for engagement with belt 74 to maintain proper tension on the belt. Moving inward to the sprockets 72, an endless drive chain 76 operably connects it with aligned sprocket 77 on the outer end of the shaft 78 of the upper conditioning roll 32 to impart counterclockwise rotation thereto, as viewed in FIG. 3. Similarly, the drive chain 79 imparts opposite clockwise rotation from the drive sprockets 73 to the aligned driven sprockets 80 secured to the outer end of shaft 81 of the lower conditioning roll 33. The opposite and clockwise rotation is achieved by directing chain 79 over a pair of reversing idler sprockets (not shown) before embracing sprocket 80.

On the opposite end of the upper roll shaft 78, there is a relatively small diameter drive sprocket 82 (FIG. 4) which imparts the same counterclockwise rotation by an endless chain 83 to a larger diameter driven sprocket 84 secured on a rotatably mounted stub shaft 85 mounted on that opposite side of the header and preferably in axially alignment with the output shaft 37 of the gearbox 35. Also mounted outwardly of and on the same shaft 85 is the drive pulley 86 which imparts counterclockwise drive rotation to the pick-up reel R by an endless drive belt 87 engaging pulley 86 and larger driven pulley 88 attached on the reel shaft 89. The reel R is disposed generally above and slightly forward of the cutting mower M, and the counterclockwise drive of the reel is necessary to enable the tines of the reel arm or bars 30 to sweep crop material rearwardly over the mower M. A pair of idler pulleys (not shown) are adjustably mounted on the header frame and are preferably interposed in the reel drive for tensioning purposes.

It is apparent from the foregoing description that the reel, mower and conditioner rolls are continuously driven when the power is furnished to the gearbox 35 through the power take-off shaft 50 of the tractor.

Power means for moving the header H from an operative position, as shown in FIG. 1, to the transport position, as shown in FIG. 2, is provided by the hydraulic actuator C which receives pressurized fluid from the towing tractor T preferably through flexible hydraulic lines, not shown. The hydraulic actuator assembly C comprises a cylinder 20 which is fixed to the radially extended bracket 18 of the draft frame, and a reciprocating piston 22. Actuation of the unit serves to rotate rockshaft 13, and transmits generally pivotal movement to the header through the wheel arms 15 which are pivotally attached at their inner radial ends to said rockshaft 13, and through connecting links 55 and 56 described hereinabove. A pair of adjustable, counterbalancing spring assemblies 57 connected between flanges 65 attached to the upper reaches of the wheel arm frames and to brackets 64 on the header side panels, serve to primarily maintain the header in floating position during operation.

A telescopic link assembly L is connected between the bracket 19 and bellcrank arm 18 to limit movement of the header in the counterclockwise direction as viewed in FIGS. 1 and 2.

The important feature of the invention is the header balance and suspension system which comprises the connecting links 55 and 56, and the spring assemblies 57, preferably assembled in pairs on opposite sides of the frame. The header H is pivotally movable about the axis of the rockshaft 13 and in its operative position may be lightly supported on said ground engaging guide shoes 28, with the major portion of the header weight being supported by the heavy duty spring assemblies 57. It will be seen that when a field depression is encountered the header or either end thereof will drop down so that the crop material is severed at a uniform height throughout the field. By utilizing connecting links of relatively short length and inclining them slightly upwardly, together with the resilient counterbalancing spring assemblies 57 a pivotal movement is obtained enabling the header to recoil upwardly and rearwardly responsive to the application of a sharp rearward force or impact against the cutter bar of the mower, as by hitting a hidden stump or rock. More specifically, the front ends of the upper links 56 are attached at 62 to the header brackets 61, at a point elevated above the point of attachment 63 of the rearward ends thereof to the medial portion of the respective hypotenuse wheel frame members 16. Similarly, the lower links 55 attach their forward ends underneath the header at a point generally midway between the mower M and the more vertical back edge of the side frame members, with said forward point of attachment 58 being disposed above the rearward point of attachment 60 on the rockshaft mounted depending crank arms 59. This arrangement, together with the resilient counterbalancing spring assemblies, readily provides for impact relief of the header. Under most operating conditions, the counterbalance springs provide for substantially full support of the header.

OPERATION

It is apparent that the harvester when towed through a field of standing crop material effectively mows the crop and rakes it rearwardly by the crop engaging fingers on the rotating wheel R. The tines or fingers deliver the material into the bite of the conditioner rolls K which after conditioning the crop material discharge the same rearwardly and upwardly into either the windrow shields W to consolidate the material and form it into a windrow, or the material may be dispatched onto the ground in a full width swath as desired. It is further apparent from the foregoing description that with the unique suspension system, the header will follow the contour of the ground in the above described manner to evenly cut the crop material at all times, as well as provide for impact relief to the header upon engagement with a stubborn obstacle.

DESCRIPTION OF SECOND PREFERRED EMBODIMENT

Referring to FIGS. 7 and 8, a modified embodiment of the header suspension will now be described.

It will be apparent from a comparison of the drawing figures that the header and framework remains substantially the same in this embodiment, with only slight modification to the header suspension link means and the wheel mount framework to which the upper end of the counterbalancing spring assemblies 57' are attached. More specifically, it is apparent from a comparison of FIGS. 7 and 8 with those of FIGS. 1, 2 and 3, that the link mounting means used in the instant embodiment comprise substantially longer links 90 and 92, which the respective upper and lower sets are disposed in parallel to each other. Further, the point of attachment of the forward ends of the links of both the top and bottom sets is at a point below the point of attachment at the opposite end of the respective links. Specifically, the lower set of links 92 at their forward ends are attached to the rigid transverse framework 94 of the cutterbar mounting via spaced brackets 96, 96 on the back side thereof. At their rearward ends they are attached at 60' in the same general manner as in the previously described embodiment, to depending brackets 59', with exception that a spherical ball joint assembly 98 is utilized between crank arms 59', 59', as better seen in FIG. 8. Spherical ball joints of the type used are commercially available as from the Danuser Company. The links 92, while of substantially the same length as upper links 90, are of specifically different construction therefrom better seen in FIG. 8. Links 92 are of elongated, tapered, channel-like construction, having a substantially wider forward section to receive the elongated bearing and mounting pin assembly 100. It is apparent that this widened link and its mounting provides the prerequisite horizontal stability to the header, by the use of these laterally spaced connections.

In this embodiment the wheel support frame comprises only members 15' and 17', and are fabricated in such a manner that the hypotenuse element 16, used in the first described embodiment, is not necessary. It will be noted that member 17' is of heavier duty channel stock, and is of wider formation at its base attachment with arm 15' to provide additional rigidity to this framework. Accordingly, upper links 90 have the rearward ends thereof attached directly to the upright member 17' at 102 instead of to the former hypotenuse member 16, while the forward ends are connected to brackets 61' by pins 62' in a similar manner as in the previously described embodiment. The same general spring assemblies 57' are preferably used to counterbalance the weight of the header and provide for the necessary flotation as described hereinbefore. When the header is in the raised condition it is partially supported by resting against the rockshaft 13 but the articulated wheel assemblies and related spring suspension still cooperate to provide a very smooth, shock dampening ride during transit thereof.

By the utilization of the longer and substantially equal length and parallel disposed upper and lower sets of links 90 and 92, together with their modified attachment, a more stable mounting is achieved which provides considerably improved lateral flotation characteristics of the header. That is to say, the longer links and attendant ball joint feature provide for a greater degree of torsion or twist when the header follows irregular ground contours, than is provided in the first embodiment utilizing shorter sets of links having inherently less torsional characteristics.

The operation of the second embodiment remains substantially the same as that with respect to the first described embodiment, perhaps with the exception that some of the advantage of instant recoil or degree of recoil of the header responsive to impact with an object such as a heavy stone or stump, is lost over that in the first described embodiment due to the different linkage pivot point disposition. By adjusting the ground-engaging shoes 28, as referred to hereinabove, the links 90 and 92 will assume a more horizontal position increasing the degree of recoil over that shown in FIG. 7.

Accordingly, it is apparent from a review of the foregoing detailed specification that an improved header suspension and flotation system is evolved which achieves all of the objects and advantages set forth in the preamble hereof, whereby the header is better balanced and stabilized, and provides for better following of the contour of the ground thereby enabling more evenly cut crop material.

While this invention has been described in connection with two particular embodiments thereof it will be understood that it is capable of modification and that this application is intended to cover any variations, uses, or adaptations following in general the principles of the invention and including such departures from the present disclosure as come within known or customary practices in the art to which the invention pertains, and as fall within the scope of the invention or the limits of the appended claims.

Having thus described our invention, what we claim is:

1. An agricultural machine of the draft type adapted for forward travel through a field, having improved mounting for a crop treating header, comprising in combination:
    (a) a wheel supported frame structure including a laterally extended rockshaft, a pair of radially extended axially spaced wheel arm assemblies pivotally mounted on said rockshaft and a ground engaging wheel on each of said wheel arm assemblies;
    (b) a draft frame pivotally mounted on one end of said rockshaft to be connected to a towing vehicle;
    (c) a sub-frame and header unit for supporting crop treating elements pivotally mounted on said rockshaft and disposed adjacent said draft frame and extending to an opposite end of said rockshaft;
    (d) rigid means and resilient means respectively operatively connecting rearward portions of said header unit to said rockshaft and to said wheel arm assemblies respectively;
    (e) said rigid means including laterally spaced sets of upper and lower pivotal connecting links, said upper links interconnecting the upper rear portion of the header unit with the wheel arm assembly, and said lower links operatively interconnecting the lower rear portion of said header unit with said rockshaft;
    (f) said resilient means including laterally spaced, spring assemblies interconnecting the rearward portion of the header unit and the wheel arm assemblies; and
    (g) lift means on said draft frame and operatively connected to said rockshaft for pivoting the latter about its horizontal axis whereby the sub-frame and header unit can be raised and lowered.

2. An agricultural machine as defined in claim 1, wherein the respective sets of upper and lower connecting links have their forward point of attachment to the header unit disposed above the respective points of attachment of the opposite ends of the respective links.

3. An agricultural machine as defined in claim 1 further including ground-engaging support means for supporting a lower forward portion of said sub-frame header unit when in its lowered operative position, and wherein the rigid lower connecting links at one end are attached spacedly behind said ground-engaging means and at their opposite ends are attached to lever means depending from said rockshaft.

4. An agricultural machine as defined in claim 1 wherein the wheel arm assemblies comprise rigid generally obtuse triangular upright framework in which the lowermost member thereof is generally horizontally disposed and comprises the wheel support arm, and the rearward ends of the upper sets of connecting links attached to a medial portion of the hypotenuse member of the triangular framework.

5. An agricultural machine as defined in claim 4 wherein
   (a) the upper connecting links are of substantially equal length and disposed in parallel to the lower connecting links; and
   (b) said upper links having their forward ends attached to the rearward part of the header frame adjacent the point of attachment of the resilient spring means, and the rearward end of said links connected to a medial portion of the upright frame member of the wheel arm assembly.

6. An agricultural machine as defined in claim 1 wherein
   (a) the sub-frame and header unit support crop treating elements, said crop treating elements including a crop severing means interposed between opposite sides of the sub-frame unit adjacent the lowermost portion thereof;
   (b) said lower link means pivotally attached at their forward ends to the mower support means adjacent the forward portion of header sub-frame;
   (c) lever means rigidly attached to said rockshaft and depending therefrom; and
   (d) said lower connecting links attached at their rearward ends to said depending lever means aforesaid.

7. An agricultural machine as defined in claim 1 wherein
   (a) said wheel arm assemblies comprise a generally horizontally disposed wheel arm and an upright frame member attached thereto adjacent the rearward end; and
   (b) said upper and lower connecting links being of substantially equal length and disposed in parallel to each other.

8. An agricultural machine as defined in claim 7 wherein
   (a) said rockshaft includes depending levers rigidly attached thereto; and
   (b) the lower set of connecting links have their rearwards ends attached to said depending levers aforesaid, and have their forward ends attached to a lower forward portion of the header sub-frame unit.

9. An agricultural machine as defined in claim 8 wherein said lower links further include
   (a) elongated horizontally disposed means journalling said forward ends of the links to said header unit for horizontal stability; and
   (b) universal type means operatively interconnecting the rearward portion of said links with said rockshaft to provide a greater degree of torsional flotation.

10. An agricultural machine as defined in claim 1 wherein
    (a) the wheel arm assemblies of paragraph (a) include generally horizontally disposed wheel arms and upright frame members attached to each of said arms and terminating approximately at the upper height of the machine; and
    (b) said spring assemblies including adjustable tension means to aid in counterbalancing the header weight, and said spring assemblies being connected to the upper reaches of said upright frame members of the wheel arm assemblies.

11. An agricultural machine as defined in claim 10 wherein the spring assemblies of paragraph (f) are attached to the rearward portion of the header unit at a point intermediate the points of connection of the upper and lower link assemblies.

12. An agricultural machine as defined in claim 1 or 7 wherein
    (a) said lower links include two sets each having laterally spaced pairs of link members; and
    (b) elongated pivot means journalling the forward ends of said links to said header to provide horizontal stability.

13. An improved mounting for a crop treating header floatingly mountable on an agricultural harvesting machine adapted for forward travel through a field of standing crop material, comprising in combination:
    (a) a main frame including a fore-and-aft directed frame member for attachment to a tow bar, and an elongated, transversely extended rockshaft mounted for relative rotation with respect to the fore-and-aft frame member;
    (b) a crop treating header unit including a sub-frame pivotally and resiliently attached to the main frame for raising and lowering movement about the axis of the transverse rockshaft, said header unit including and supporting crop treating elements;
    (c) laterally spaced frame means for operatively supporting both axially spaced ground-engaging wheels and a portion of the header unit; said frame means including radially extended, generally horizontally disposed wheel arms and being pivotally attached for independent movement to said rockshaft; said frame means further including rigidly attached, upright, header supporting frame members terminating at the approximate upper height of the machine;
    (d) ground-engaging means supporting a lower forward portion of the sub-frame when the header is in a lowered operative condition;
    (e) rigid means and resilient means cooperatively connecting said sub-frame mounted header unit in a resiliently floatingly manner to the main frame;
    (f) said rigid means including upper and lower sets of pivotal links, said upper links having one end attached near laterally opposite upper portions of the header unit and having the other end attached to a medial portion of the upright frame member of paragraph (c); and the lower links similarly attached near laterally opposite lower portions of the header unit and to means on the rockshaft respectively;
    (g) said resilient means including generally upright, laterally spaced, adjustable spring assemblies attached with one end to the upper reaches of the upright frame members of paragraph (c), and with the lower ends to the header unit intermediate the points of attachment of the respective lower and upper link members; and
    (h) power means for rotating said rockshaft to effect articulated pivotal movement of said main frame and wheel arms thereby effecting vertical adjustment of the crop treating elements by the pivotal header movement about the axis of the rockshaft.

References Cited
UNITED STATES PATENTS

| | | | |
|---|---|---|---|
| 3,151,429 | 10/1964 | Dyrdahl | 56—23 |
| 3,306,014 | 2/1967 | Halls et al. | 56—1 |
| 3,473,305 | 10/1969 | Cyr | 56—23 |

ANTONIO F. GUIDA, Primary Examiner